United States Patent
DeMatteis et al.

[11] Patent Number: 6,113,269
[45] Date of Patent: Sep. 5, 2000

[54] AUTOMATIC VENTILATING SYSTEM FOR PLASTIC BAGS

[75] Inventors: Robert B. DeMatteis, Grass Valley, Calif.; Donald Pansier, Greenbay, Wis.

[73] Assignee: Bob Dematteis Co., Grass Valley, Calif.

[21] Appl. No.: 09/258,033

[22] Filed: Feb. 25, 1999

Related U.S. Application Data

[60] Provisional application No. 60/088,613, Jun. 9, 1998.

[51] Int. Cl.⁷ .................................................. B65D 33/01
[52] U.S. Cl. .......................... 383/103; 383/10; 383/118; 428/136
[58] Field of Search ................................ 383/103, 17, 10, 383/118; 428/136

[56] References Cited

U.S. PATENT DOCUMENTS

| | | |
|---|---|---|
| Re. 33,264 | 7/1990 | Baxley . |
| Re. 34,324 | 7/1993 | Haenni . |
| D. 287,572 | 1/1987 | Dancy . |
| D. 288,779 | 3/1987 | Pilon . |
| D. 307,555 | 5/1990 | Haenni . |
| D. 308,170 | 5/1990 | Wilfong . |
| D. 323,619 | 2/1992 | Wilfong . |
| D. 325,311 | 4/1992 | Mygind . |
| D. 396,636 | 8/1998 | Wilfong . |
| 3,399,822 | 9/1968 | Kugler ..................................... 383/103 |
| 3,495,764 | 2/1970 | Crane ....................................... 383/103 |
| 3,546,327 | 12/1970 | Ruda ........................................ 383/103 |
| 3,730,076 | 5/1973 | Levin ....................................... 383/103 |
| 4,216,899 | 8/1980 | Kamp ........................................ 383/17 |
| 4,480,750 | 11/1984 | Dancy . |
| 4,529,090 | 7/1985 | Pilon . |
| 4,676,378 | 6/1987 | Baxley . |
| 4,696,403 | 9/1987 | Hoover . |
| 4,786,275 | 11/1988 | Hoover . |
| 4,793,539 | 12/1988 | Haenni . |
| 4,807,754 | 2/1989 | Rowe . |
| 4,819,899 | 4/1989 | Weil . |
| 4,849,090 | 7/1989 | Case . |
| 4,872,766 | 10/1989 | Dancy . |
| 4,911,560 | 3/1990 | Hoover . |
| 4,923,436 | 5/1990 | Gelbard . |
| 4,925,512 | 5/1990 | Briand . |
| 4,930,385 | 6/1990 | Wilfong . |
| 4,953,664 | 9/1990 | Vrooman . |
| 4,978,231 | 12/1990 | Ling et al. ............................... 383/103 |
| 4,981,216 | 1/1991 | Wilfong . |
| 4,995,860 | 2/1991 | Wilfong . |
| 5,020,750 | 6/1991 | Vrooman . |
| 5,125,604 | 6/1992 | Vrooman . |
| 5,207,367 | 5/1993 | Dunn . |
| 5,207,368 | 5/1993 | Wilfong . |
| 5,335,788 | 8/1994 | Beasley . |
| 5,362,152 | 11/1994 | Fletcher et al. ......................... 383/103 |
| 5,562,580 | 10/1996 | Beasley . |
| 5,667,173 | 9/1997 | Wilfong . |
| 5,845,779 | 12/1998 | Wilfong . |
| 5,881,882 | 3/1999 | Fletcher . |

FOREIGN PATENT DOCUMENTS

| | | | |
|---|---|---|---|
| 639709 | 4/1962 | Canada ................................... | 383/103 |
| 2582625 | 12/1986 | France .................................... | 383/13 |
| 1201537 | 9/1965 | Germany ................................ | 383/13 |
| 2802849 | 7/1978 | Germany ................................ | 383/103 |
| 2807162 | 8/1978 | Germany ................................ | 383/103 |
| 886612 | 1/1962 | United Kingdom ................... | 383/103 |

*Primary Examiner*—Stephen P. Garbe
*Attorney, Agent, or Firm*—Townsend and Townsend and Crew LLP

[57] ABSTRACT

Ventilation slits are placed in a plastic bag wall for opening in response to tension passing through the bag wall as the bag is carried. A conventional bag has a front bag wall, with the front bag wall having a top, a bottom, and two parallel side edges. The rear bag wall is of identical construction. The bag is conventionally sealed at the sides and bottom and typically carried from the top. The bag is improved by providing at least one bag wall with a plurality of vent apertures. In the preferred embodiment, each vent aperture has a first slit and a second slit with the slits inclined both to one another and with respect to the edges of the bag wall. Preferably, the vent apertures defined by the inclined slits overlying one another in parallel spaced apart relation. When the plastic bag is loaded at the bottom and carried from the top, stress in the bag wall or passes around the slits, causing the slits to open as vent apertures responsive to the stress. While inclined slits are preferred, embodiments are shown with an array of horizontally disposed slits for the ventilation, these slits preferably being in rows and columns.

13 Claims, 6 Drawing Sheets

AUTOMATIC VENTILATING SYSTEM FOR PLASTIC BAGS

CROSS-REFERENCES TO RELATED APPLICATIONS

This application claims priority from Provisional Patent Application No. 60/088,613 filed Jun. 9, 1998 by the named inventor herein entitled Plastic Film Hinging patent application Ser. No. 09/257,345 filed Feb. 25, 1999 of even date herewith entitled Plastic Film Hinging and Precreasing Process is likewise incorporated by reference as if filly set forth herein.

This application claims priority from Provisional Patent Application entitled Cold Sealing of Plastic Film No. 60/088,612 filed Jun. 9, 1998, by the named inventor herein. Patent application Ser. No. 09/257,848 filed Feb. 25, 1999 of even date herewith entitled Apparatus and Process for Cold Seal in Plastic Bags is likewise incorporated by reference as if fully set forth herein.

This application claims priority from Provisional Patent Application No. 60/089,582 filed Jun. 17, 1998 by the named inventor herein entitled Plastic Bag Bundling System. Patent application Ser. No. 09/258,010 filed Feb. 25, 1999 of even date herewith entitled Plastic Bag Bundling System is likewise incorporated by reference as if fully set forth herein.

This application claims priority from Provisional Patent Application No. 60/089,583 filed Jun. 17, 1998 by the named inventor herein with Don Pansier of Greenbay, Wis. entitled Automatic Ventilating System.

This application claims priority from Provisional Patent Application No. 60/092,232 filed Jul. 9, 1998 entitled Plastic Bag Manufacturing Process by the named inventor herein. Patent application Ser. No. 09/257,843 filed Feb. 25, 1999 of even date herewith entitled Plastic Bag Manufacturing Process is likewise incorporated by reference as if fully set forth herein.

Finally, this application claims priority from Provisional Patent Application No. 60/092,233 filed Jul. 9, 1998 entitled Plastic Film Rigidity Means by the named inventor herein. Patent application Ser. No. 09,258,015 filed Feb. 25, 1999 of even date herewith entitled Plastic Film Rigidity Means is likewise incorporated by reference as if fully set forth herein.

The above Provisional Applications and all following Regular Patent Applications filed of even date herewith—and all of them—are herein incorporated by reference as if fully set forth herein.

FIELD OF THE INVENTION

This invention relates to plastic bag usage in food applications. More specifically, this invention relates to the venting of plastic film in order to allow moisture vapor or gas transfer as may be desirable with certain baked goods, fresh fruits and vegetables or hot foods.

BACKGROUND OF THE INVENTION

Common plastic bag styles used by retailers in fast food chains, supermarkets, and general merchandise, as well as certain point-of-purchase applications, are typically of the bottom seal or sideweld variety. These bags are usually gusseted along their sides or along the bottom with the open bag mouth at the top. Many of these common bags have carrying handles for customer convenience, which are usually of the strap variety or die-cut holes. Typical plastic bags used in supermarket applications are about 0.0005 to 0.00065 in gauge; those used as fast food bags are usually from 0.0007 to 0.00125, and; those used in point of purchase applications may be anywhere from 0.0005 to 0.004 millimeters of thickness. Retailers that desire to have a bag that allows for easy gas and vapor transmission usually use paper bags instead of plastic bags, since plastic serves as a virtually non-porous barrier which does not readily allow vapor or gas transmission. Two excellent examples in which moisture vapor and gas transmission is important is in a hot foods application such as hot French fries, or in a baking applications such as sourdough bread and bagels (the outer crust must maintain a certain hardness). In both of these applications, the French fries or the bread products, the foods will become soggy and generally lose customer appeal if plastic bags are used. Large fast food chains, such as McDonald's and Burger King, continue to use paper bags for carry out due to this factor. And virtually all sourdough and all fresh-made bagel companies also prefer paper to retain the hard outer crust. Many other similar food applications, such as crispy or crunchy cookies, or certain vegetables such as cauliflower and lettuce, also require ventilation. In food applications with fruits and vegetables, they will require adequate ventilation to prevent the growth of molds or fungi. In certain other applications it is desirable to have a vented package in which certain gases may enter a bag in order to help preserve the food product contained within while being transported or being stored, which extends shelf life.

Ventilating plastic film is well known in the art. In U.S. Pat. No. 3,762,629 Bruno reveals a lattice network on a plastic sheet that has been commonly used as lettuce wrap. In his U.S. Pat. No. 4,709,400 Bruno also reveals vented bags with ties which may be used for bundling fruits such as grapes. Micro-perforations are also commonly used in some bakery applications as well as some vegetable and fruit uses such as that illustrated in U.S. Pat. No. 5,171,593, Doyle. In U.S. Pat. No. 5,362,152, Fletcher, et al, reveal a T-shirt bag which has "C-shaped" vent holes which, allow for air ventilation in hot food applications. As is well-known in the art, there are various means of controlling the amount of air ventilation, such as using fillers and additives to the film, adding moisture absorbent packets inside bags and so on. These means of control increase the cost of a bagged product substantially and would typically be impractical for the high volume, mass merchandise, carry out food, bakery, or produce related businesses such as fast food restaurants or in many supermarket produce and bakery applications.

SUMMARY OF THE INVENTION

Ventilation slits are placed in a plastic bag wall for opening in response to tension passing through the bag wall as the bag is carried. A conventional bag has a front bag wall, with the front bag wall having a top, a bottom, and two parallel side edges. The rear bag wall is of identical construction. The bag is conventionally sealed at the sides and bottom and typically carried from the top. The bag is improved by providing at least one bag wall with a plurality of vent apertures. In the preferred embodiment, each vent aperture has a first slit and a second slit with the slits inclined both to one another and with respect to the edges of the bag wall. Preferably, the vent apertures defined by the inclined slits overlie one another in parallel spaced apart relation. When the plastic bag is loaded at the bottom and carried from the top, stress in the bag wall passes around the slits, causing the slits to open as vent apertures responsive to the stress. While inclined slits are preferred, embodiments are shown with an array of horizontally disposed slits for the ventilation, these slits preferably being in rows and columns.

The present invention allows air ventilation and gas transfer to increase or decrease based upon the load in a plastic bag. Instead of using ventilation holes (the most commonly used ones are round such as in the '152 patent), the present invention incorporates a series of cut vent lines that open up when a plastic bag is put under load and carried by a user. The more it is under load, the more the vent lines open up. Furthermore, the ventilation lines may also cover a comparatively wide area of film surface in the most important locations for air ventilation and gas transfer—the central front and rear bag walls or gusset regions—without negatively affecting the bag's integrity. The vent lines may be placed in non-stress locations and opened by tensile stresses passing through the bag wall adjacent to the slits.

This air ventilation, gas transfer technique can be applied to a wide variety of plastic bags suitable for carrying foods and the methodology may be easily adapted to existing bag making machinery.

For ease of explanation, only three particular bag styles will be used to illustrate the present invention. The reader will understand, this invention applies to other applications, which fall under the scope of the present invention.

DESCRIPTION OF THE SPECIFIC EMBODIMENTS

Figure 1:
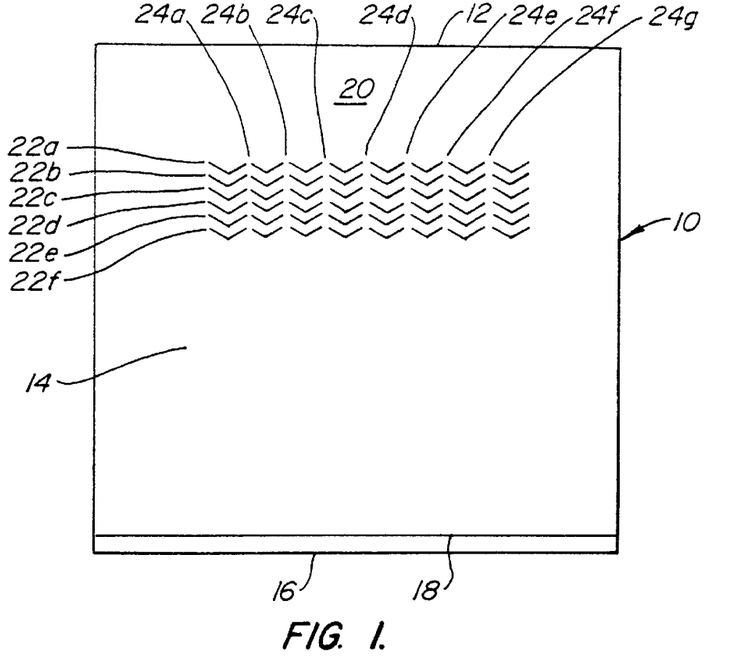
FIG. 1 is a plan view of the present invention with the vent lines coursing through the front and rear walls of a plastic die-cut handle bag.

In FIG. 1, plastic bag 10 has an openable bag mouth 12 at the top, a front wall, 14 and a rear wall (not shown); a bottom 16 formed by lateral bottom seal 18 and a handle region 20 at the top. Below handled region 20 are six horizontally positioned vent lines 22a, 22b, 22c, 22d, 22e and 22f, which are die-cut through front wall 14 and the rear wall (not shown). These vent lines 22a through 22f would typically be spaced about ⅛" to ¼" apart and are seen in the closed position. In vent line 22a, the vent line peaks remain connected to the front bag wall via tit connections 24a, 24b, 24c, 24d, 24e, 24f and 24g. Not shown are the corresponding tit connections of the vent line peaks of vent line 22a to the rear bag wall. The peaks in each subsequent vent line 22b, 22c, 22d, 22e and 22f, are likewise connected to the bag walls at their peaks by a small piece of plastic bag material, all of which connections are pictured but not numbered herein in order to avoid superfluous redundancy. The tit connections at vent line peaks are usually about ¹⁄₁₆" to ¹⁄₃₂" wide depending upon film gauge and bag size. These vent lines may also be located lower in the bag body or in groups, in the side portions of the bag.

Figure 2:
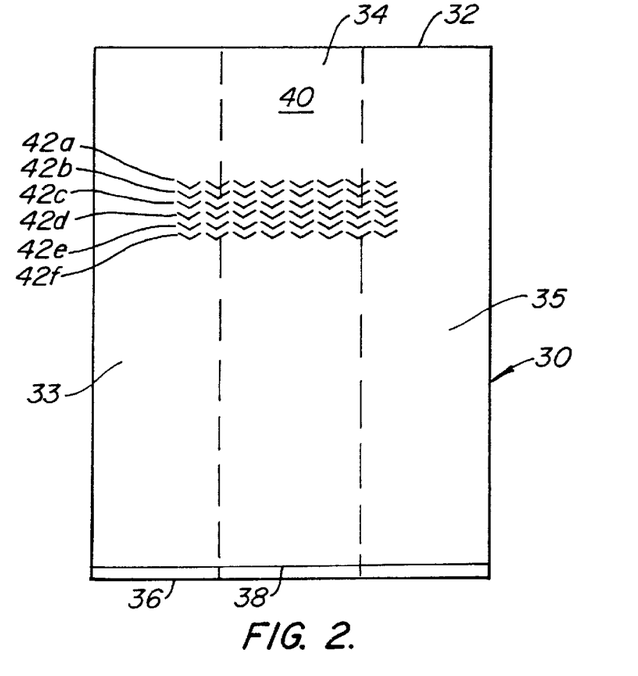
FIG. 2 is a plan view of the present invention with the vent lines coursing through the front wall, rear wall and the gussets of a plastic die-cut handle bag.

In FIG. 2, plastic bag 30 has an openable bag mouth 32 at the top, a front wall, 34 and a rear wall (not shown), two side gussets 33 and 35, a bottom 36 formed by lateral bottom seal 38 and a handle region 40 at the top. Below handled region 40 are six horizontally positioned vent lines 42a, 42b, 42c, 42d, 42e and 42f, which are die-cut through front wall 34, the rear wall (not shown) and the side gussets 33 and 35, all of which vent lines are in the closed position. Vent lines 42a, 42b, 42c, 42d, 42e and 42f are of substantially the same variety as those described in detail in FIG. 1. In this illustration, vent lines being die cut through the front and rear walls as well as the gussets increase the amount of surface area that is vented. It is important to note that the vent lines contained herein are of a "v-shape", but similar results may be obtained by using other shapes such as a wave or just about any other lattice-like combination, and even straight lines. The key is to have them spatially connected by tit connections in order to properly open and vent air or allow gas passage as required and is further illustrated in FIGS. 4 and 5.

Figure 3:
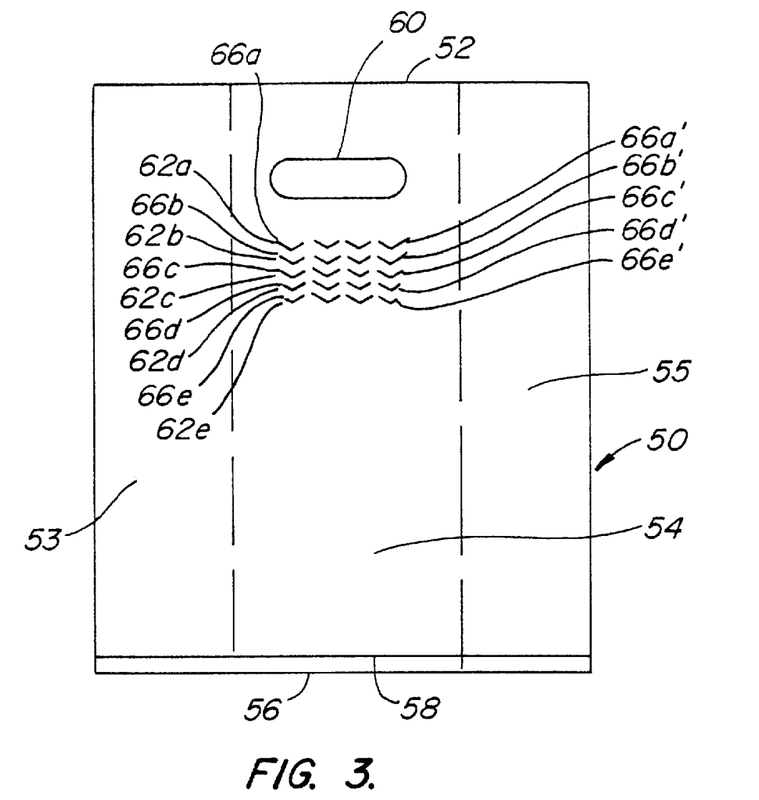
FIG. 3 is a plan view of the present invention with a preferred embodiment of the use of vent lines as it may be applied to a plastic die-cut handle bag.

In FIG. 3, plastic bag 50 has an openable bag mouth 52 at the top, a front wall, 54 and a rear wall (not shown), two side gussets 53 and 55, a bottom 56 formed by lateral bottom seal 58 and a die-cut handle 60 at the top. Below die-cut handle 60 are one form of the preferred embodiment of the present invention with five horizontally positioned vent lines 62a, 62b, 62c, 62d and 62e, which are die-cut through front wall 34 and the rear wall (not shown). Vent lines 62a, 62b, 62c, 62d and 62e are of the same variety as those described in detail in FIG. 1 being spaced about ⅛" apart and being connected at their peaks. Vent lines 62a, 62b, 62c, 62d and 62e also have their respective ends 66a and 66a', 66b and 66b', 66c and 66c', 66d and 66d', and 66e and 66e' pointing upwards at a diagonal angle, which upwardly pointing angle provides more tear resistance when the bag and the subsequent vent lines are placed under load. This is because most plastic films have a tendency to tear in either the vertical or horizontal direction (machine or traverse direction). Also, vent line 62a is shown as being slightly longer than vent line 62b, which is slightly longer than vent line 62c, which is slightly longer than vent line 62d and so on. The reason for this is illustrated in the following FIG. 4.

Figure 4:
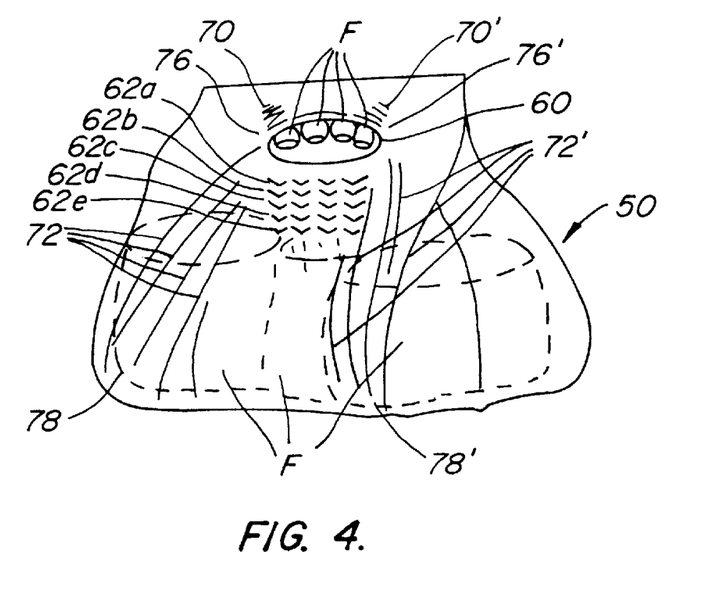
FIG. 4 is a perspective view of the bag in FIG. 3, which bag has been fully loaded and shows the, stress on the bag when under load.

In FIG. 4 a user's fingers F have been inserted into die-cut handle 60 of bag 50 (which is the same bag as in FIG. 3) with foods F fully loading and filling the inside of bag 50 as it is being carried by the user. Upon the lifting of bag 50, about 80% of the handle carrying stress is located at upper stress points 70 and 70'. The weight of the bag creates two lower stress locations which are illustrated by stress lines 72 and 72', which stress lines generally follow a point beginning at the two outer locations 76 and 76' where fingers F have been inserted into handle 60, and trail downwards to the two outer, lower regions 78 and 78' of the fully loaded bag 50. As illustrated the vent lines 62a, 62b, 62c, 62d and 62e are clearly underneath the upper stress points 70 and 70' and inside of the lower stress locations, lines 72 and 72' resulting in a minor amount of stress being applied to the vent lines.

Figure 5:
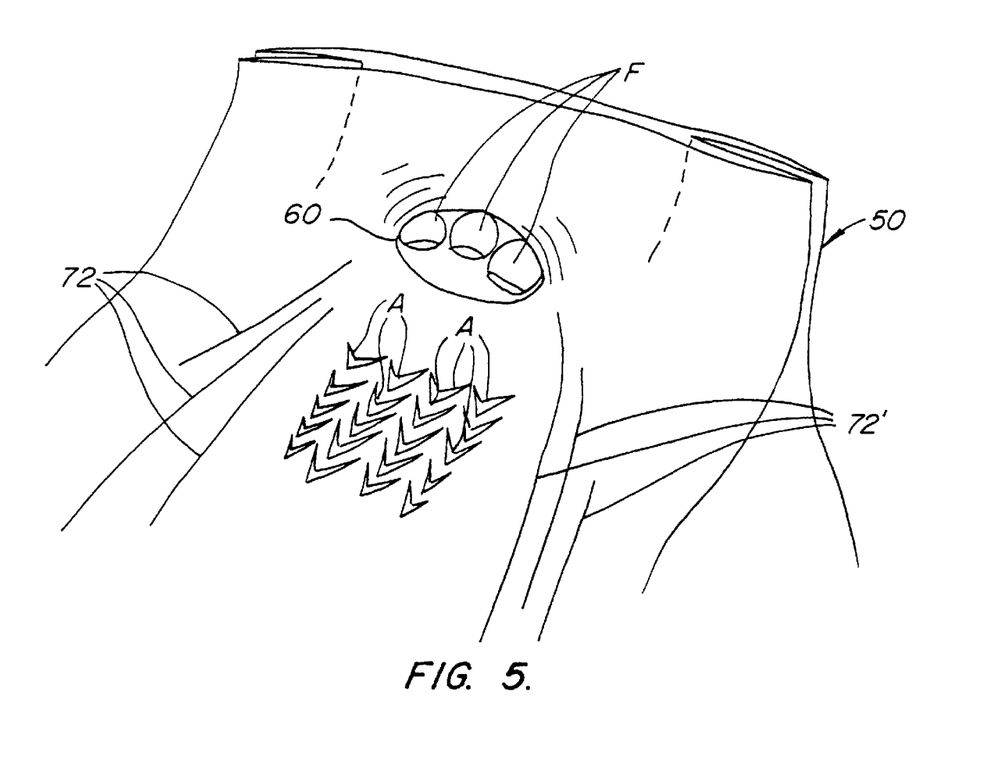
FIG. 5 is a blown-up perspective view of the vents lines of the bag in FIGS. 3 and 4 which shows the opening of the vent lines when placed under the stress of a full load.

In FIG. 5 the vent lines 62a, 62b, 62c, 62d and 62e of bag 50 in FIGS. 5 are illustrated in their open position because when bag 50 was put under a full load. It will be noted that the minor amount of stress applied to vent lines 62a, 62b, 62c, 62d and 62e have "tweaked open" the vent lines allowing hot air vapor A (schematically shown as wavy lines) to escape. It should be pointed out that the more the bag is under load, the more the stress there is on lower stress locations 72 and 72', thereby increasing the minor stress at the vent lines and causing them to open even wider. Another phenomena that contributes to the opening of the vent lines is that the larger the load is inside a bag, the more the front and rear walls will blouse outwards at an angle. The steeper the angle is from vertical, the more it too will force the vent lines 62a, 62b, 62c, 62d and 62e to open up. It is also important to note that vent lines when placed under load and tweaked open allow the air to escape from the bag directly upwards without restraint. In contrast, with air attempting to escape from a bag with "C-shaped" vent holes or vent holes with flaps, there would have to be sufficient vapor pressure built up inside the bag to cause the flaps to open up and escape. Likewise, the air inside the bag would then escape by first moving upwards and then second taking a 90-degree turn to exit out the flapped hole.

Figure 6:
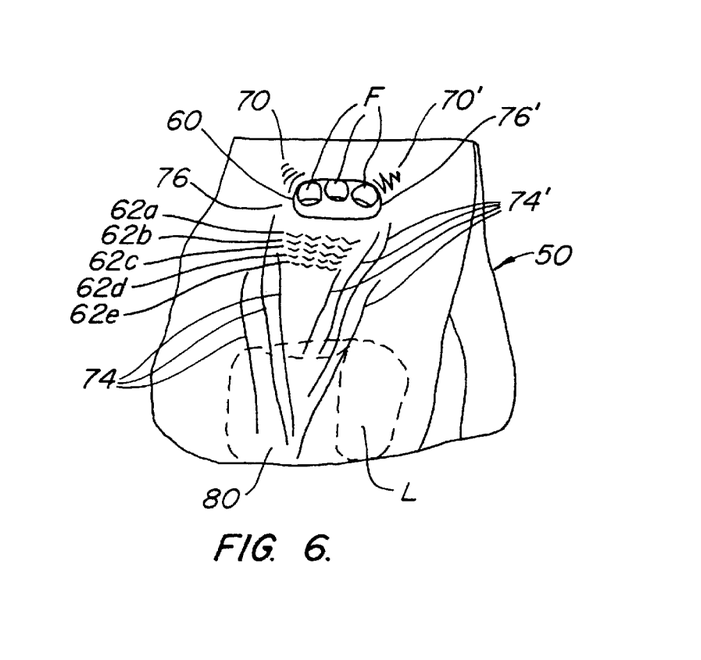
FIG. 6 is a perspective view of the bag in FIG. 3, which bag has been partially loaded and shows the stress on the bag when under a lightweight load.

In FIG. 6 a user's fingers F have been inserted into die-cut handle 60 of bag 50 (which is the same bag as in FIG. 3) with only a single, lightweight food item L loaded into the bag and filling only the lower, center inside area of bag 50. Upon the lifting of bag 50, about 80% of the handle carrying stress is located at upper stress points 70 and 70'. The lightweight food item L in the lower, center area of the bag creates two lower stress locations which are illustrated by stress lines 74 and 74'. These stress lines generally follow a point beginning at the two outer locations 76 and 76' where fingers F have been inserted into handle 60, and trail downwards to one generally center lower region 80 near the bottom of bag 50 with its lightweight load L. As illustrated the vent lines 62a, 62b, 62c, 62d and 62e are clearly underneath the upper stress points 70 and 70' and inside the lower stress locations, lines 74 and 74' resulting in a minor amount of stress being applied to the vent lines. It should also be noted that the vent lines 62a, 62b, 62c, 62d and 62e are not vulnerable to the more prevalent stress exerted in stress lines 74 and 74' because each vent line is shorter than the one above it as described in detail in FIG. 3. As shown in FIG. 3, the group of vent lines 62a, 62b, 62c, 62d and 62e are tapered with the top vent line 62a being the longest and the bottom vent line 62e being the shortest. This tapering of the group of vent lines enables all the vent lines to conform inside (the area of less stress) of stress lines 74 and 74' when bag 50 is placed under a lightweight load. It should be noted that when bag 50 is put under a lightweight load, the light load causes less minor stress on the vent lines than when under a heavy load, in which the lighter load causes the vent lines to not open quite as wide. Also smaller lightweight loads tend not to be stacked up inside a bag as a heavier load may be. Thus the front and rear walls will not blouse outwards at an angle that is as steep (from vertical) as the angle on a heavy load, and the vent lines will tend not to open as wide.

Figure 7:
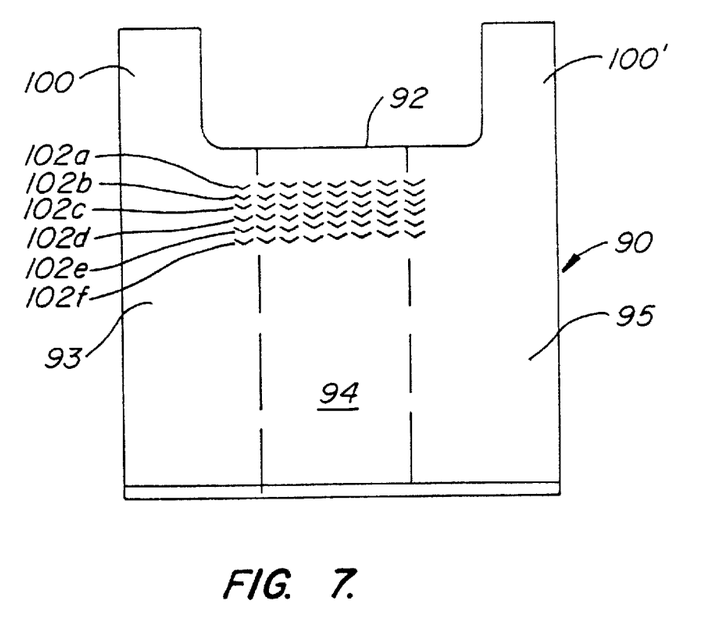
FIG. 7 is a plan view of the present invention as it may be applied to a plastic T-shirt style bag.

In FIG. 7 plastic bag 90 has an openable bag mouth 92 at the top, a front wall 94 and a rear wall (not shown), two side gussets 93 and 95, a bottom 96 formed by lateral bottom seal 98. Two strap handles 100 and 100' are shown at the top, outer regions. Below bag mouth 92 are six horizontally positioned vent lines 102a, 102b, 102c, 102d, 102e and 102f, which are die-cut through front wall 34, the rear wall (not shown) and the side gussets 93 and 95, all of which vent lines are in the closed position. Vent lines 102a, 102b, 102c, 102d, 102e and 102f are of substantially the same variety as those described in detail in FIGS. 1.

Figure 8:
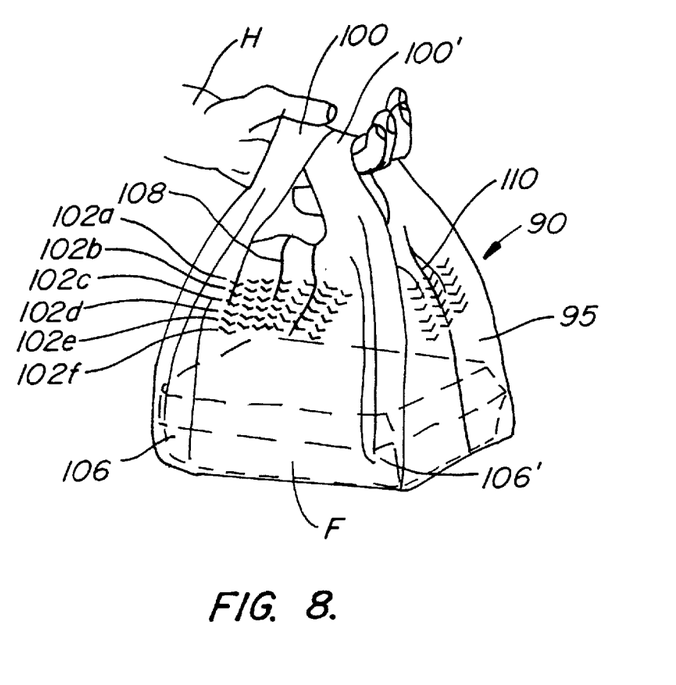
FIG. 8 is a perspective view of the bag in FIG. 7, which bag has been loaded and shows the stress on the bag and the bunching up of bag material when placed under load.

In FIG. 8, a user's hand H has been inserted into strap handles 100 and 100' of bag 90 (which is the same bag as in FIG. 7) with foods F filling the inside of bag 90 as it is being carried by the user. Upon the lifting of bag 90, the stress from the load begins at strap handles 100 and 100' and generally moves downward as illustrated by stress lines 104 and 104' to two outer bottom regions 106 and 106' of bag 90. The two side gussets 93 (not shown) and 95 are subjected to minor stress when under load. As illustrated the vent lines 102a, 102b, 102c, 102d, 102e and 102f are generally inside the stress lines 104 and 104' on the front wall 94, and respectively on the rear wall (not shown). The bunching up of the film in region 108 below the bag mouth is caused by the joining of the handles 100 and 100' inside the user's hand H. This bunching of the film has caused vent lines 102a, 102b, 102c, 102d, 102e and 102f to tweak open in much the same manner as described in FIGS. 4 and 5. In side gusset 95 the vent lines 102a', 102b', 102c', 102d', 102e' and 102f' have also been caused to open up to allow air to escape since they have been subjected to minor stress under load and the film region 110 has also bunched up. The same phenomenon occurs in side gusset 93 (not shown).

Figure 9A:
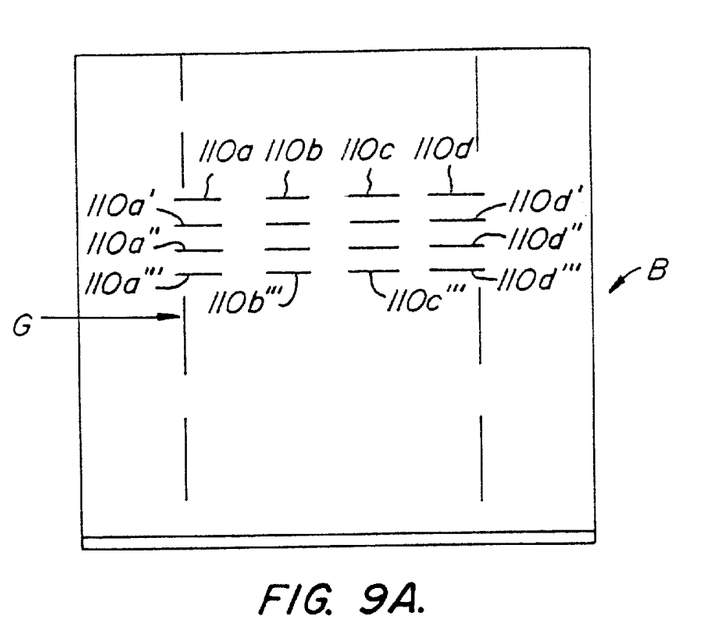
FIGS. 9A and 9B are respective front elevations of the front panel of a bag with gussets having the ventilation slits horizontal and aligned in columns and rows with FIG. 9A illustrating the bag before loading and FIG. 9B illustrating the bag after loading to open the vents.
Figure 9B:
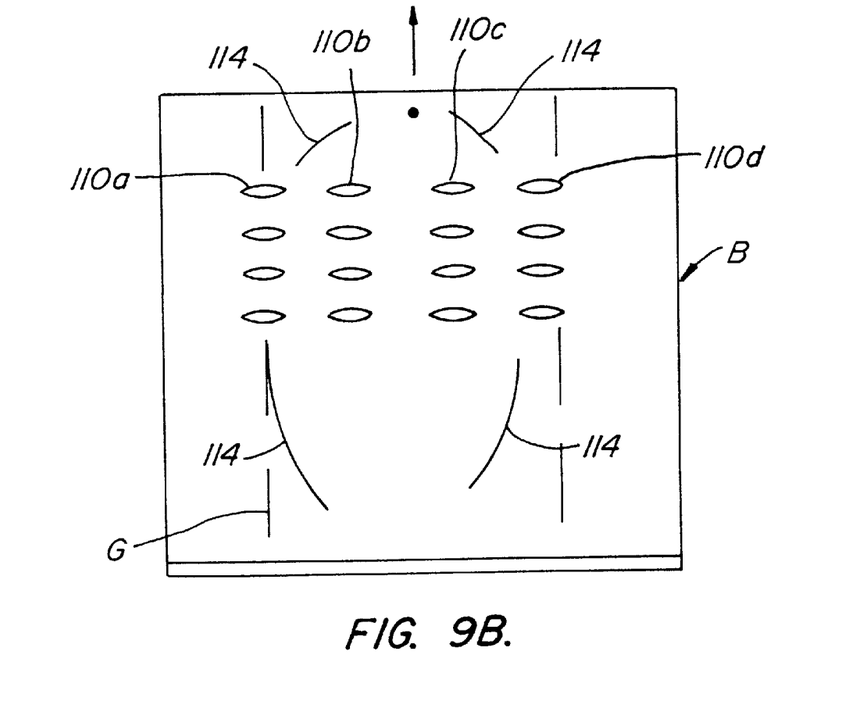

Referring to FIGS. 9A and 9B, bag B with gussets G is shown. In this embodiment, horizontal ventilation slits 110a–d are aligned in vertical columns and rows over horizontal ventilation slits 1110a'–d', horizontal slits 110a"–d" and finally horizontal slits 110a'"–d'". Viewing FIG. 9B, loading on front panel 112 is schematically illustrated. This loading causes the respective slits to bias to the open position with load lines 114 illustrating the passage of loading stresses in the front panel 112 of bag B. Those having skill in the art will know that some plastic films preferentially tear either horizontally or vertically. As a consequence, it is preferred to use a multi layer film, which has at least one layer to inhibit propagation of tearing from each of the respective horizontal slits.

Figure 10A:
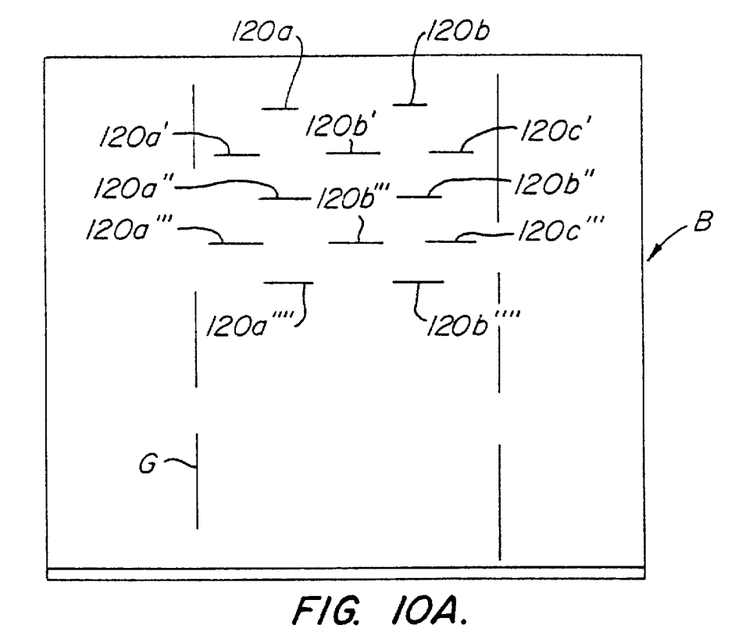
FIGS. 10A and 10B are respective front elevations of the front panel of a bag with gussets having the ventilation slits horizontal and with a staggered alignment in alternate columns with FIG. 10A illustrating the bag before loading and FIG. 10B illustrating the bag after loading to open the vents.
Figure 10B:
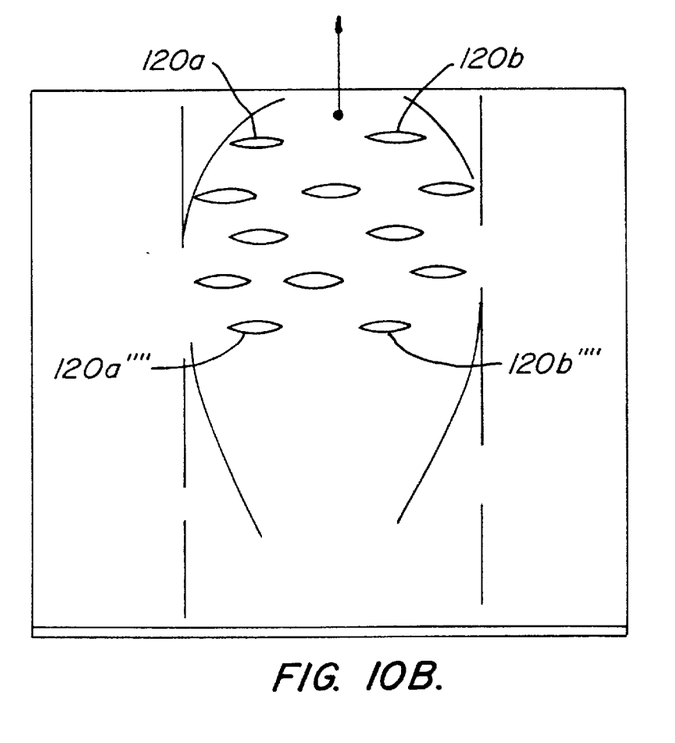

Referring to FIGS. 10A and 10B, bag B with gussets G is shown. In this embodiment, horizontal ventilation slits 120a14 b are aligned, in a direction that is parallel to the length of the columns, with alternate rows of horizontal ventilation slits 110a'–c', horizontal slits 120a"–b", horizontal slits 120a'"–c'", and horizontal slits 110a"" and 120b"". Viewing FIG. 9B, loading on front panel 122 is schematically illustrated. This loading causes the respective slits to bias to the open position with load lines 124 illustrating the passage of loading stresses in the front panel 122 of bag B. Similar to the case illustrated with respect to FIGS. 9A and 9B, it is preferred to use a multi layer film which has at least one layer to inhibit propagation of tearing from each of the respective horizontal slits.

From the foregoing descriptions of the use of ventilating systems on bags suitable for carrying food products, it will be appreciated that neither the style of the bag is important, nor is the material in which it is made. What is important is to have vent lines placed in a location on a carrying bag, which vent lines will open when placed under load or the bag film is bunched up. It is not the intention of the present invention to be limited solely to the bag products illustrated herein. This invention applies where such slit shaped vents improve the performance of food carryout products in bags. This is regardless of whether the bags be bottom sealed, side gusseted bags, bottom gusseted sideweld bags, back sealed bags or pouches and so on.

It should also be appreciated that the means of making these vent lines is best accomplished by die cutting processes, but other cutting processes (for instance the use of in-line razors or lasers) may accomplish the same objective. Thus it is not an intention to limit the scope of the invention to only die cut vent lines.

Furthermore, while the present invention refers to die cut handled bags and strap handle bags such as those used in supermarkets, any bag that has any form of handle or handled region will cause substantially the same effect when a bag is placed under load and carried.

What is claimed is:

1. In a plastic bag having:
   a front bag wall having a top, a bottom, and two parallel side edges;
   a rear bag wall having a top, a bottom, and two parallel side edges;
   first and second connections between the front bag wall and the rear bag wall at the two parallel side edges of the front bag wall and the rear bag wall for forming a continuous bag body about a central portion of the plastic bag;
   a bottom connection between the front bag wall and the rear bag wall at the bottom of the front bag wall and the rear bag wall for forming a bottom of the plastic bag under the central portion of the plastic bag; and,
   a bag handle with an opening configured at a top portion of the front and rear bag wall to permit the plastic bag to be grasped at the handle and to permit the plastic bag with contents to be transported while tension stresses pass through the front bag wall and the rear bag wall to the bottom connection;
   the improvement to the bag comprising:
      at least one of the front bag wall or rear bag wall has an array of vent apertures at a central portion thereof, said array including rows of vent apertures, said rows each having adjacent apertures spaced apart by a connection,
      said array positioned below the bag handle and having a boundary defined by uninterrupted and continuous portions of the at least one wall which includes the array, a first of said portions of the at least one wall spacing the array away from the handle, a second of said portions spacing the array from the bottom connection and a third of said portions extending from the boundary of said array to at least one parallel side edge of the at least one wall;
      each vent aperture comprising a linear slit which extends in a direction which is at an angle to a direction that tension stresses pass along said at least one wall when the bag is carried with its contents; and
      at least one of the rows of vent apertures of said array overlying another of said rows on said at least one wall whereby when the plastic bag is carried, tension stresses in a said at least one wall pass around the vent apertures in the central portion of the at least one wall causing the vent apertures to open in response thereto at the linear slits.

2. The plastic bag according to claim 1 wherein the array includes at least three rows of said vent apertures, and wherein the vent apertures of said three rows are aligned with each other in a direction extending parallel to the side edges of said front and rear bag walls.

3. The plastic bag according to claim 1 wherein the array includes at least three rows of said vent apertures, and wherein the vent apertures of the first row are aligned with the vent apertures of the third row in a direction extend parallel to the side edges of said front and rear walls but not with the vent apertures of the second row.

4. In a plastic bag having:
   a front bag wall having a top, a bottom, and two parallel side edges;
   a rear bag wall having a top, a bottom, and two parallel side edges;
   first and second connections between the front bag wall and the rear bag wall at the two parallel side edges of the front bag wall and the rear bag wall for forming a continuous bag body about a central portion of the plastic bag;
   a bottom connection between the front bag wall and the rear bag wall at the bottom of the front bag wall and the rear bag wall for forming a bottom of the plastic bag under the central portion of the plastic bag; and,
   a bag handle with an opening configured at a top portion of the front and rear bag wall to permit the plastic bag to be grasped at the handle and to permit the plastic bag with contents to be transported while tension stresses pass through the front bag wall and the rear bag wall to the bottom connection;
   the improvement to the bag comprising:
      at least one of the front bag wall or rear bag wall including an array of vent apertures at a central portion thereof, said array including rows of said vent apertures with adjacent apertures being spaced along a respective row of the array by a connection,
      said array of vent apertures positioned below the bag handle and having a boundary defined by uninterrupted and intact side portions of said at least one wall which includes the array, a first of said portions of the at least one wall spacing the array away from the handle, a second of said portions spacing the array away from the bottom connection and third of said portions extending the boundary of said array to at least one parallel side edge of the at least one wall;
      each vent aperture comprising only a first angularly inclined linear slit and a second angularly inclined linear slit with respective angularly inclined linear slits joining one another at an angle and each inclined with respect to the two parallel side edges of the bag wall, each of the inclined linear slits being disposed at an angle to tensional stresses passing along the front bag wall or the rear bag wall to open in response to tensional stress passing through the front or rear bag wall at the vent apertures; and
      at least one of the rows of vent apertures overlying another one of said rows on said at least one wall whereby when the plastic bag is carried, tension stresses in the at least one wall pass around the vent apertures in the central portion of the at least one wall causing the vent apertures to open at the linear slits in response to the tension stresses.

5. The plastic bag of claim 4 wherein:
   a plurality of the vent apertures are positioned side-by-side, and a plurality of the vent apertures overlie one another.

6. The plastic bag of claim 4 and wherein:

the vent apertures define a "V" shape; and, an apex of the "V" shape is downwardly disposed.

7. The plastic bag of claim 4 and wherein:

the vent apertures are defined in the front bag wall and the rear bag wall.

8. A plastic bag including a handling portion and a ventilating apparatus for a wall of the plastic bag, the wall disposed between an upper bag opening and a lower bag bottom for supporting loads which create stress along the wall when the bag is carried, the ventilating apparatus comprising in combination:

the plastic bag wall having a top, a bottom, and two parallel side edges, the wall coming under stress when an article is placed in the plastic bag and the bag is carried by the handling portion adjacent the operating of the bag;

the wall having an an array of vent apertures, said array including rows of adjacent apertures spaced a distance apart in a direction perpendicular to the side edges of said bag wall by a connection;

said array positioned below the bag opening and said handling portion, said array including a boundary defined by continuous and uninterrupted portions of the wall, a first of said portions of the wall spacing the array away from the handling portion, a second of said portions spacing the array away from the bag bottom and a third of said portions extending from the boundary of said array to at least one parallel side edge of the wall;

each vent aperture having only a first angularly inclined slit and a second angularly inclined slit with respective angularly inclined slits joining one another at an angle and each angularly inclined with respect to the two parallel side edges of the bag wall; and, the vent apertures of at least one row overlying the vent apertures of an adjacent row in parallel spaced apart relation whereby when the plastic bag is carried from the handling portion or the opening of the bag, stress in the bag wall passes around the vent apertures causing the vent apertures to open responsive to the stress.

9. A plastic bag according to claim 8 wherein:

a plurality of the vent apertures are positioned side-by-side.

10. A plastic bag according to claim 8 wherein:

the vent apertures define a "V" shape; and, an apex of the "V" shape is downwardly disposed.

11. A a plastic bag according to claim 8 wherein:

the vent apertures are defined in a plurality of bag walls.

12. A plastic bag according to claim 8 wherein:

the vent apertures are defined in a bag gusset.

13. In a plastic bag having:

a front bag wall having a top, a bottom, and two parallel side edges;

a rear bag wall having a top, a bottom, and two parallel side edges;

first and second connections between the front bag wall and the rear bag wall at the two parallel side edges of the front bag wall and the rear bag wall for forming a continuous bag body about a central portion of the plastic bag;

a bottom connection between the front bag wall and the rear bag wall at the bottom of the front bag wall and the rear bag wall for forming a bottom of the plastic bag under the central portion of the plastic bag;

a bag handle with an opening configured at a top portion of the front and rear bag wall to permit the plastic bag to be grasped at the handle and to permit the plastic bag with contents to be transported while tension stresses pass through the front bag wall and the rear bag wall to the bottom connection;

at least one of the front bag wall or rear bag wall including an array of vent apertures at a central portion thereof, said array including rows of said vent apertures with adjacent vent apertures being spaced along a row of the array by a connection having a distance, said array positioned below the bag handle and having a boundary defined by uninterrupted and continuous portions of the at least one wall which includes the array, a first of said portions of the at least one wall spacing the array away from the handle, a second of said portions spacing the array away from the bottom connection and a third of said portions extending from the boundary of said array to at least one parallel side edge of the at least one wall a distance which is greater than the distance between adjacent apertures of the row of said array;

a plurality of said vent apertures each overlying at least one other vent aperture in said array, each vent aperture of said array comprising having a linear slit which extends in a direction transverse to a direction that tension stresses pass along said at least one wall when the bag is carried and which opens when tension stresses pass along the front or rear bag wall at the vent aperture; and whereby when hot food is carried within the plastic bag, tension stress in the at least one wall will pass around the vent apertures in the central portion of the at least one wall so that the vent apertures will open at the linear slits in response to the tension stress to let moisture from the hot food exit the bag.

* * * * *